United States Patent [19]
Wetzels et al.

[11] 3,945,284
[45] Mar. 23, 1976

[54] PARTING TOOL FOR SEVERING TRAVELING ELONGATED MATERIAL INTO PREDETERMINED LENGTHS

[75] Inventors: Walter Wetzels, Eynatten, Belgium; Johann Greven, Aachen, Germany

[73] Assignee: Schumag Schumacher Metallwerke GmbH, Aachen, Germany

[22] Filed: Apr. 2, 1975

[21] Appl. No.: 564,301

[30] Foreign Application Priority Data
Apr. 4, 1974 Germany.......................... 2416467

[52] U.S. Cl. ...................... 83/290; 83/294; 83/318
[51] Int. Cl.² ........................................ B23D 25/00
[58] Field of Search ............ 83/294, 318, 319, 320, 83/290

[56] References Cited
UNITED STATES PATENTS
2,757,734   8/1956   Richardson...................... 83/320 X Primary Examiner—J. M. Meister
Attorney, Agent, or Firm—Herbert L. Lerner

[57] ABSTRACT

Parting device for severing a traveling elongated material into predetermined lengths, including track means, a tool slide carrying a parting tool and mounted on said track means for traveling thereon in a direction parallel to a path along which the elongated material travels past the parting device, the tool slide being displaceable at a speed in synchronism with that of the traveling elongated material as a predetermined length is being severed from the elongated material by the parting tool and being displaceable back to a starting position after the predetermined length has been severed, control means for initiating the foregoing displacements of the tool slide, reversible, flexibly yielding drive means ever actuatable for the severing operation and capable of imparting a travel speed to the tool slide greater than the synchronized speed without braking the tool slide, a member traveling at a speed continously in synchronism with the travel speed of the elongated material, and overrunning clutch means interposed between the tool slide and the member for limiting the speed of the tool slide from exceeding the synchronous speed while permitting the tool slide to lag behind the member.

11 Claims, 5 Drawing Figures

PARTING TOOL FOR SEVERING TRAVELING ELONGATED MATERIAL INTO PREDETERMINED LENGTHS

The invention relates to a parting device for severing elongated material traveling from a processing machine into predetermined lengths and, more particularly, to such a device having a tool slide carrying a parting tool and displaceable on a track in a direction parallel to the direction of travel of the elongated material, the tool slide being displaceable in synchronism with the elongated material as the latter is being severed and being displaceable back to a starting position after the severing operation has taken place, and including control means for initiating the displacements of the tool slide.

Processing machinery that can be furnished with such a parting device include rolling mills, drawing plants, pipe welding apparatus, straightening equipment and the like. In such machinery, the production process is not halted during the parting operation, and the parting devices must travel a given distance along the direction of travel of and in synchronism with the material being processed. If the synchronism is not sufficiently accurate, danger arises that the parting tools may break. Parting tools that may be involved in such an operation are especially saws or shears.

The synchronism need only be maintained during the severing operation per se. The tool slide is set in motion from a starting position at rest prior to the actual severing operation, is displaced during the parting or severing operating per se at a speed synchronized with that of the traveling material, and is returned to its starting position after the parting or severing operation has been completed. In order to attain an adequately accurate synchronism, costly hydraulically or electronically driven feeding devices for the tool slide with suitable control devices, are being employed with conventional parting devices of this general type. Feeding devices are known wherein the tool slide is connected to the drive of the processing or production machine associated therewith a system of transmissions and clutches in order to produce the synchronism in the speeds of travel to the material and of the tool slide. The relatively high frequency of clutch engagements and the masses of the clutch components that are continuously being accelerated and decelerated cause considerable wear within the clutch components and within the clutches. This is all the more significant because the heretofore known devices of this general type are, in any event, very costly and take up considerable space. Furthermore, the servicing of these heretofore known devices and equipment can be effected only by trained personnel.

It is accordingly an object of the invention to provide a parting deivce for severing traveling elongated material into predetermined lengths, according to the invention, which is of such construction that the acceleration, synchronous displacement and return motion of the tool slide is effected by relatively simple means yet with great accuracy and, in fact, also with the everincreasing operating speeds and very high frequency of clutch engagement occurring today, and that minimizes wear.

With the foregoing and the other objects in view, there is provided, in accordance with the invention, a parting device for severing a traveling elongated material into predetermined lengths, comprising track means, a tool slide carrying a parting tool and mounted on the track means for traveling thereon in a direction parallel to a path along which the elongated material travels past the parting device, the tool slide being displaceable at a speed in synchronism with that of the traveling elongated material as a predetermined length is being severed from the elongated material by the parting tool and being displaceable back to a starting position after the predetemined length has been severs, control means for initiating the foregoing displacements of the tool slide, reversible, flexibly yielding drive means actuatable to perform the severing operation and to impart a travel speed to the tool slide greater than the synchronized speed without braking the tool slide, a member traveling at a speed continuously in synchronism with the travel speed of the elongated material, and over-running clutch means interposed between the tool slide and the member for limiting the speed of the tool slide from exceeding the synchronous speed while permitting the tool slide to lag behind the member.

By means of the overrunning clutch, the synchronously driven member is able to carry out the synchronous motion thereof without entraining the tool slide, while the tool slide is in the rest or starting position thereof. When the parting or severing operation is initiated, the flexibily yielding drive accelerates the tool slide until the overrunning clutch engages automatically and the slide forcibly carries out its motion at the synchronous speed of the synchronously driven member, because the slide is prevented by the overrunning clutch from exceeding the synchronous speed while it is permitted by the flexibly yielding drive to adopt a speed slower than the synchronous speed. After the termination of the parting operation, the flexibly yielding drive reverses the direction thereof, at which the overrunning clutch is again automatically released and effects the return displacement of the tool slide to the starting or rest position thereof, while the synchronously driven member continues to be driven at synchronous speed.

The construction of the parting device of the invention is relatively simple and clear. The functioning of the inventive parting device is very reliable actually also because of the relatively simple construction thereof. Also, maintenance of the parting device according to the invention is relatively easy to perform and can be effected by unskilled servicing personnel. The reliability of the inventive parting device of this application is assured also at very high operating speeds as is necessary due to the demands for ever faster production plants. It has been determined by tests that the parting device of the invention of the instant application readily affords material traveling speeds exceeding 150 meters per minute and that, at these speeds, synchonism between the material and the parting tool is reliably assured. The reversing i.e. double-acting, flexibly resilient drive for the tool slide can have a very simplified construction, for example, by the use of spring forces. The synchronous driven member which is continuously driven at a speed synchronizing with the speed of the material is subject to little wear through mass acceleration forces and mass deceleration forces. The over-running clutch is virtually not stressed at all during free-wheeling and, when engaged, except for the driving force, needs only to overcome the braking forces which result during the engagement of the clutch from the then briefly occurring difference in the speeds of the tool slide and the synchronously driven member.

Tests have shown that the braking forces are relatively small. The driving forces which are then needed to maintain synchronism are ever smaller. All of these forces, however, cause very little wear in comparison to the wear that occurs in conventional parting devices wherein the transmission system and clutches for each parting or severing operation, must be accelerated from zero to the nominal speed and then decelerated from the nominal speed to zero. Even conventional oil-hydraulic feeding devices for the tool slide have deficiencies. They tend to become excessively hot and must be additionally cooled. Furthermore, over a period of time, oil leaks are unable to be avoided.

All of the foregoing shortcomings of the heretofore known parting devices are avoided in the parting device of the invention of the instant application.

In accordance with a preferred embodiment of the invention of this application, the flexibly yielding drive means for the tool slide comprises a cylinder operable by compressed air and having a reversing piston having mechanical means continuously connecting the piston to the tool slide. With this type of flexibly yielding drive, the accelerating forces required for operating the tool slide can be produced without difficulty. The drive is, nevertheless, sufficiently yielding so as to prevent the speed of the synchronously driven member from being significantly affected when the over-running clutch engages.

In accordance with a further feature of the invention, the mechanical means connecting the piston to the tool slide comprises a cable extending over reversing rollers and simultaneously serving as piston rods for the reversing piston, the cable having an outer portion secured to the tool slide and extending parallel to at least part of the track means. The construction and force transmission are extremely simple therein. Even during lengthy operation and with high travel speeds of the material, only minimal wear is produced. The cable or rope is preferably a steel cable. Advantageously, it may be provided with a coating of synthetic material for sealing the passage openings in both end faces of the cylinder.

In accordance with added features of the invention, actuating means are provided having contacts cooperable for initiating the severing operation and controlled valve means for simultaneously supplying compressed air to the cylinder. Furthermore, the cylinder and the piston are adapted to accommodate given air pressures and air quantities to effect an optimally short accelerated travel (for example, less than 100 mm) of the tool slide with substantially smooth engagement of the over-running clutch means. Tests have established that these two requirements can be brought into agreement with one another. The shorter the path during which acceleration takes place, the smaller will be the axial or longitudinal tolerances when severing the elongated material into the predetermined lengths.

In accordance with yet another feature of the invention, the traveling elongated material is delivered by a processing machine to the parting device, and the synchronously traveling member comprises a roller chain revolving over sprocket wheels and having a run traveling at synchronous speed with the elongated material and parallel to the track means, one of the sprocket wheels serving as means for synchronously driving the member and being connected for positive rotation to a main shaft of the processing machine.

In accordance with an additional feature of the invention, the positive rotational connection comprises a main shaft for the parting device, and transmission gear means (preferably meshing bevel gears) drivingly connecting the main shaft of the parting device to the one sprocket wheel which serves as the synchronously driven means. The synchronism is speed between that of the material throughput and that of the main shaft of the processing machine can be effected with adequate accuracy. The synchronously driven sprocket wheel and the roller chain will then also run very accurately in the same direction and at synchronous speed with the material. All the wheels taking part in the synchronous drive run continuously at uniform speed and exhibit no wear manifestations as a result of mass accelerations and decelerations. The main shaft driving the parting device of the invention may be identical with the main shaft of the material processing machine.

The over-running clutch in the parting device of the invention of the instant application and the means for effecting the cooperation thereof with the synchronously driven member and the tool slide can be constructed in various ways.

In accordance with a concomitant feature of the invention, the over-running clutch comprises a radial roller bearing having an inner and an outer bearing race and includes wedge member mounted on the inner bearing race and having surfaces inclined in the direction of freewheeling of the over-running clutch, the inner bearing race being non-rotatably mounted on the tool slide, and including a sprocket wheel seated on the outer bearing race and being connected therewith non-rotatably relative thereto, the last-mentioned sprocket wheel being in continuous meshing engagement with the synchronously traveling run of the roller chain. In accordance with another feature of the invention, the parting device comprises two diverting sprocket wheels mounted on the tool slide, the diverting sprocket wheels being idly rotatable and being spaced from the sprocket wheel non-rotatably connected to the outer bearing race so as to extend the synchronously traveling run of the roller chain in an increased looping angle about the sprocket wheel non-rotatably connected to the outer bearing race.

In accordance with an additional feature of the invention, the roller chain is at least of double (possibly triple) construction, and the sprocket wheels have a corresponding structure to accommodate the roller chain. The pitch of such a chain and that of the chain wheels may be smaller and the transfer of forces in mesh will then be especially smooth and even, thereby assuring a synchronism that is particularly good and accurate. Basically, not all of the sprocket wheels need to accommodated to the construction of the roller chain. It is quite sufficient, for example, merely for the sprocket wheel imparting the drive and the sprocket wheel mounted on the outer bearing race of the over-running clutch to be sprocket wheels that are constructed to mesh with the roller chain. The wheels which serve only to divert the travel of the chain may have smooth peripheral surfaces containing no sprocket teeth.

In an especially advantageous embodiment of the invention, the slide track and the tool slide per se are disposed in a vertical plane, and the compressed-air cylinder as well as the axes of the diverting or reversing wheels associated with the cable driven by the reversing piston and the axes of the sprocket wheels are all disposed horizontally. In such an assembly, all the components are readily accessible and a minimum of labor and time is required for servicing. It is also possible, however, to dispose the axes of the diverting rollers for the cable in vertical direction.

Other features which are considered as characteristic for the invention are set forth in the appended claims.

Although the invention is illustrated and described herein as embodied in a parting tool for severing traveling elongated material into predetermined lengths, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 2:
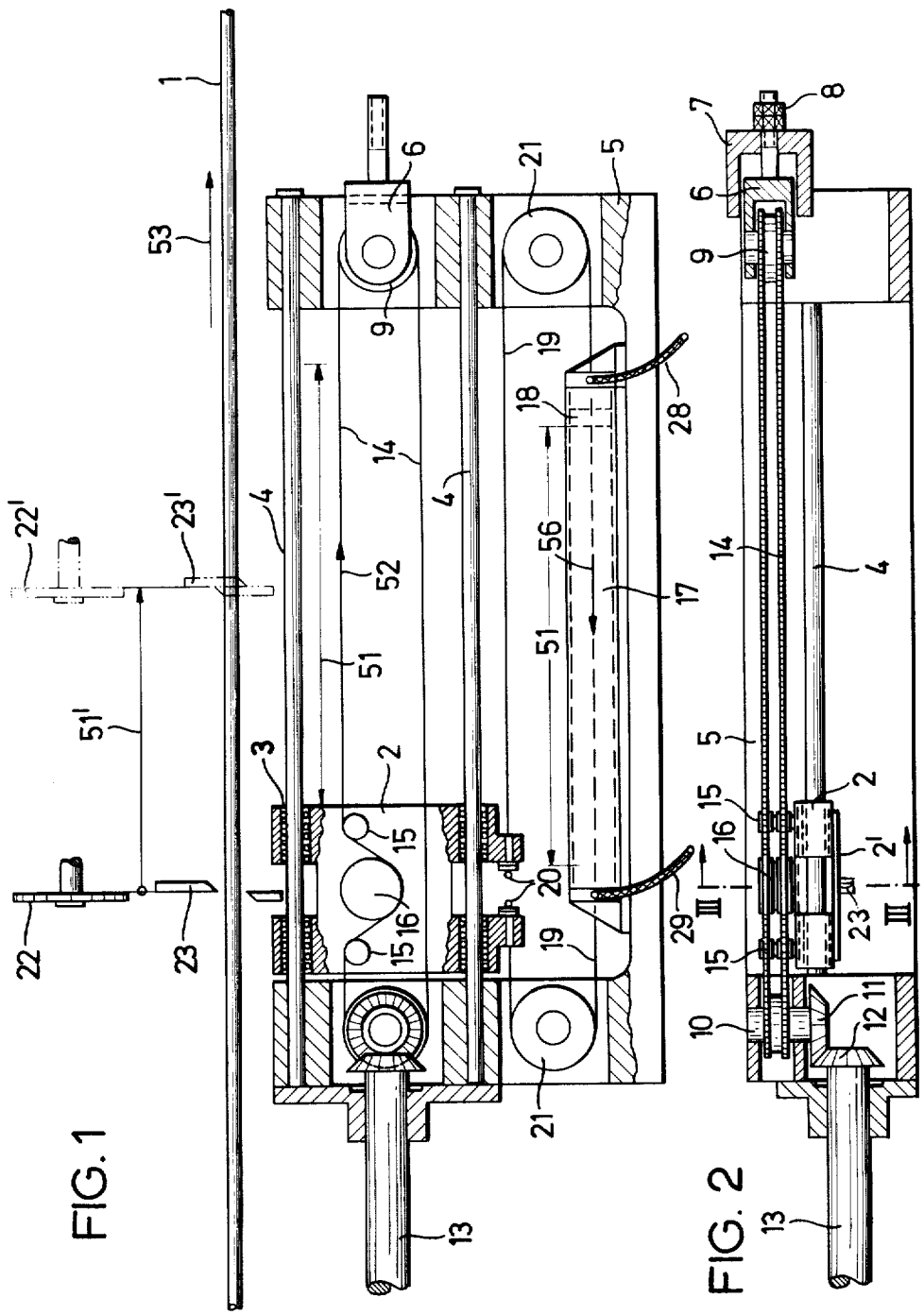
FIG. 1 is a diagrammatic front elevational view, partly in section, of the complete parting device of the invention, as seen from the operator's side thereof.
FIG. 2 is a top plan view, partly in section, of the parting device of FIG. 1.
Figure 3:
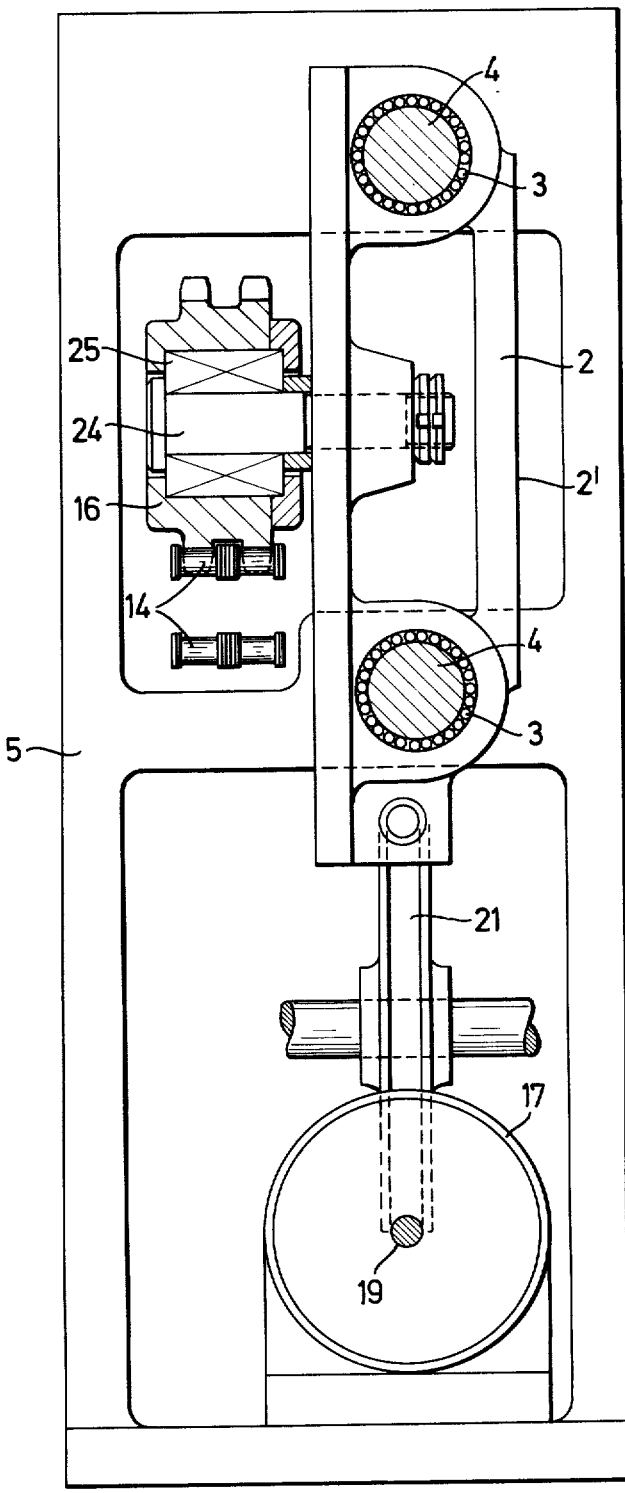
FIG. 3 is an enlarged sectional view of FIG. 2 taken along the Line III—III in the direction of the arrows.

Referring now to the drawing and first, particularly to FIGS. 1 and 2 thereof, there is shown a tool slide 2 carrying a parting tool that is secured by any suitable means to a face 2' of the slide 2. The tool slide 2 is mounted on antifriction bearings 3 for travel along guide rails of a track 4 supported in a machine frame 5. The tool slide 2 is reciprocable with a maximum stroke or travel distance 51.

A reversing piston 18 has a working stroke in a cylinder 17 equal to the maximum stroke 51 of the tool slide 2. The tool slide 2 is securely connected to the ends 20 of a steel cable 19 sheathed with synthetic material. The steel cable 19 extends over reversing rollers or pulleys 21 to the piston 18 of the cylinder 17. The steel cable 19 is tautly secured at its ends 20 to the tool slide 2. The moment the piston is displaced in the cylinder 17 due to the introduction of compressed air into the latter, the tool slide 2 is automatically displaced therewith, however, the travel directions of the piston 18 and the tool slide 2 are always opposite to one another.

An endless roller chain 14, at reversing locations thereof, travels over sprocket wheels 9 and 10. The sprocket wheel 9 serves simultaneously for tensioning the chain 14, and is mounted in a tensioning device 6, 7, 8 which is supported on the machine frame 5. The sprocket wheel 10 is driven through bevel gears 11 and 12 by a main shaft 13. The chain 14 and a traveling strand of material 1 have a synchronized speed which is assured for every speed due to the connection with the main shaft 13. If the travel speed of the material 1 should vary, the speed of the chain 14 synchronized therewith varies in the same manner. The upper run of the chain 14, as viewed in FIG. 1, has a constant travel direction represented by the arrow 52 which is the same as that of the material strand 1, as represented by the arrow 53.

Figure 4:
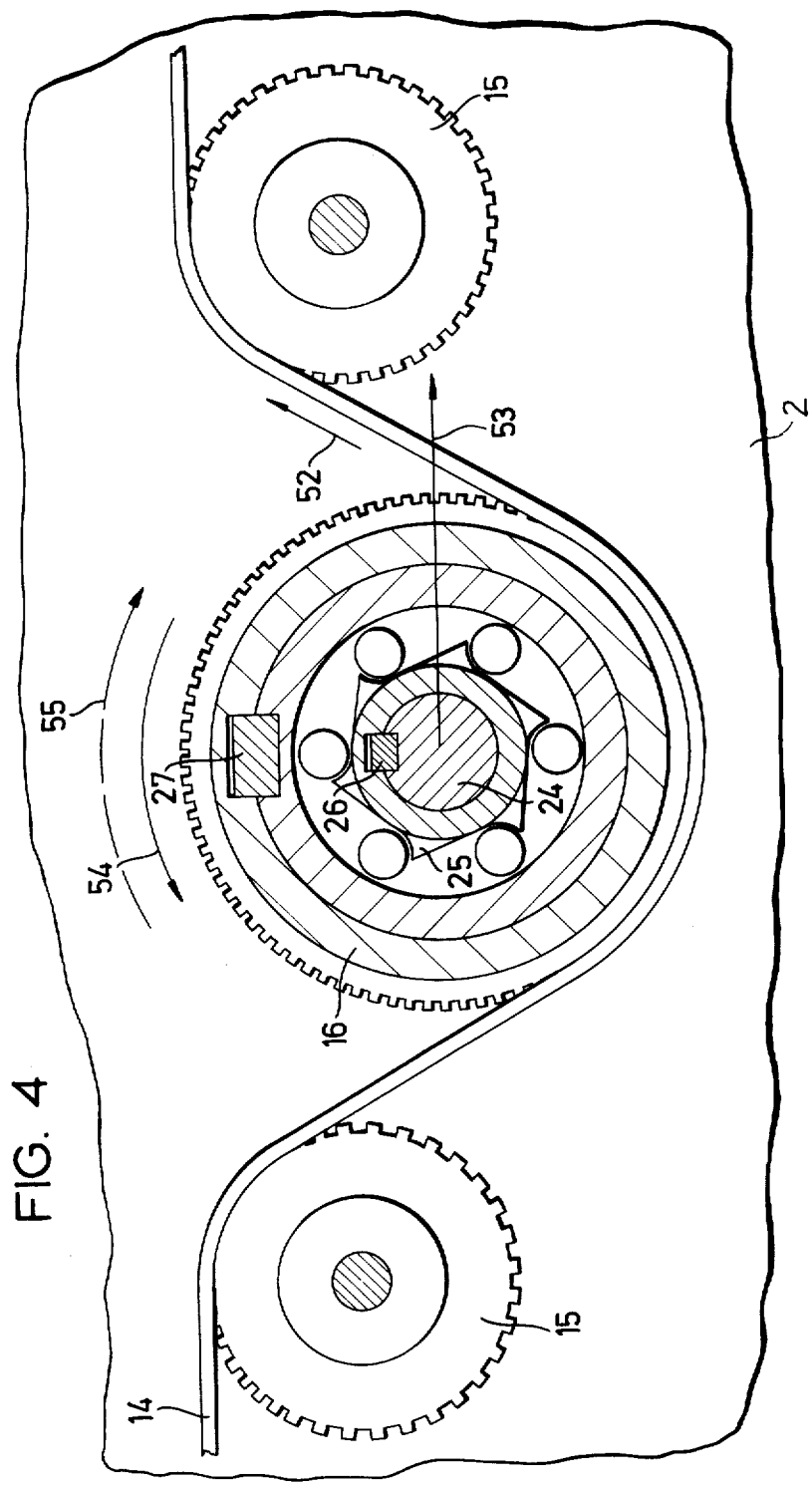
FIG. 4 is a much enlarged fragmentary view of FIG. 1, partly in section, showing the disposition of the over-running clutch of the parting device.

As shown more clearly in FIG. 4, the sprocket wheel 16 is mounted through the intermediary of an over-running clutch 25 on a pivot 24 which is secured to the tool slide 2. The chain 14 is passed over diverting or deflecting sprocket wheels 15 so that a satisfactory loop of the chain 14 about the sprocket wheel 16 is available. The diverting sprocket wheels 15 are also mounted on the tool slide 2 but they are free to swivel in any direction, for example, by being loosely mounted on their shafts.

The sprocket wheel 16 can freely revolve only in the direction represented by the arrow 54. In the opposite direction represented by the arrow 55, the over-running clutch 25 will engage. Shaft keys 26 and 27 prevent unwanted torsion or slip.

Referring again to FIG. 1, the tool slide 2 is shown therein in starting position i.e. in position of rest. The moment the parting or severing operation is initiated by making a contact, the cylinder 17 is supplied with compressed air through a pipeline 28 so that the piston 18 is displaced in direction of the arrow 56. The tool slide 2 is displaced at the speed of the stroke of the piston 18 in direction of the arrow 53 because of the steel cable 19 connected to the tool slide 2. As the speed of the tool slide 2 is accelerated, the sprocket wheel 16 turns all the more slowly until it reaches the point at which the over-running clutch engages. The over-running clutch maintains the speed of the slide 2 at that of the speed-determining chain 14 until the piston 18 changes its direction of travel i.e. reverses its stroke.

The quantity of air and the air pressure are adjustable by conventional control devices so that, depending upon the speed of travel of the material 1 a substantially uniform or constant acceleration of the speed of the tool slide 2 is obtained over the distance from the rest or starting position of the tool slide 2 to the point at which the speed of the tool slide 2 equals that of the material 1.

The tool slide 2 can travel a distance corresponding to that of the maximal stroke 51. The full length of the stroke is not required, however. The particular length of stroke 51' required for every parting or severing operation depends upon the time necessary to complete the operation.

The length of stroke 51' includes the distances traversed during acceleration of the tool slide 2, which is optimally less than 100 mm during travel of the tool slide 2 at a speed synchronized with that of the material strand 1, during slow-down or deceleration of the tool slide 2 and during return travel of the tool slide 2 to the rest or starting position thereof. The severing operation per se takes place during the period of travel at a speed synchronized with that of the material 1. A parting or severing operation performed by means of a saw 22, 22' will take more time than a parting or severing operation performed by means of shears 23, 23'. Thus, under equal conditions, the length of stroke 51' is longer with sawing than with shearing.

The moment a conventional control switch signals that the parting or severing operation has ended, control means reverse the supply of compressed air, which is then delivered to the cylinder 17 through the pipeline 20 causing a reversal in the direction of travel of the piston 18. The tool slide 2 is thereby restored to the rest or starting position thereof. The required length of the distance 51 depends upon the maximal traversal speed of the material and the maximal time required for the parting or severing operation.

Figure 5:
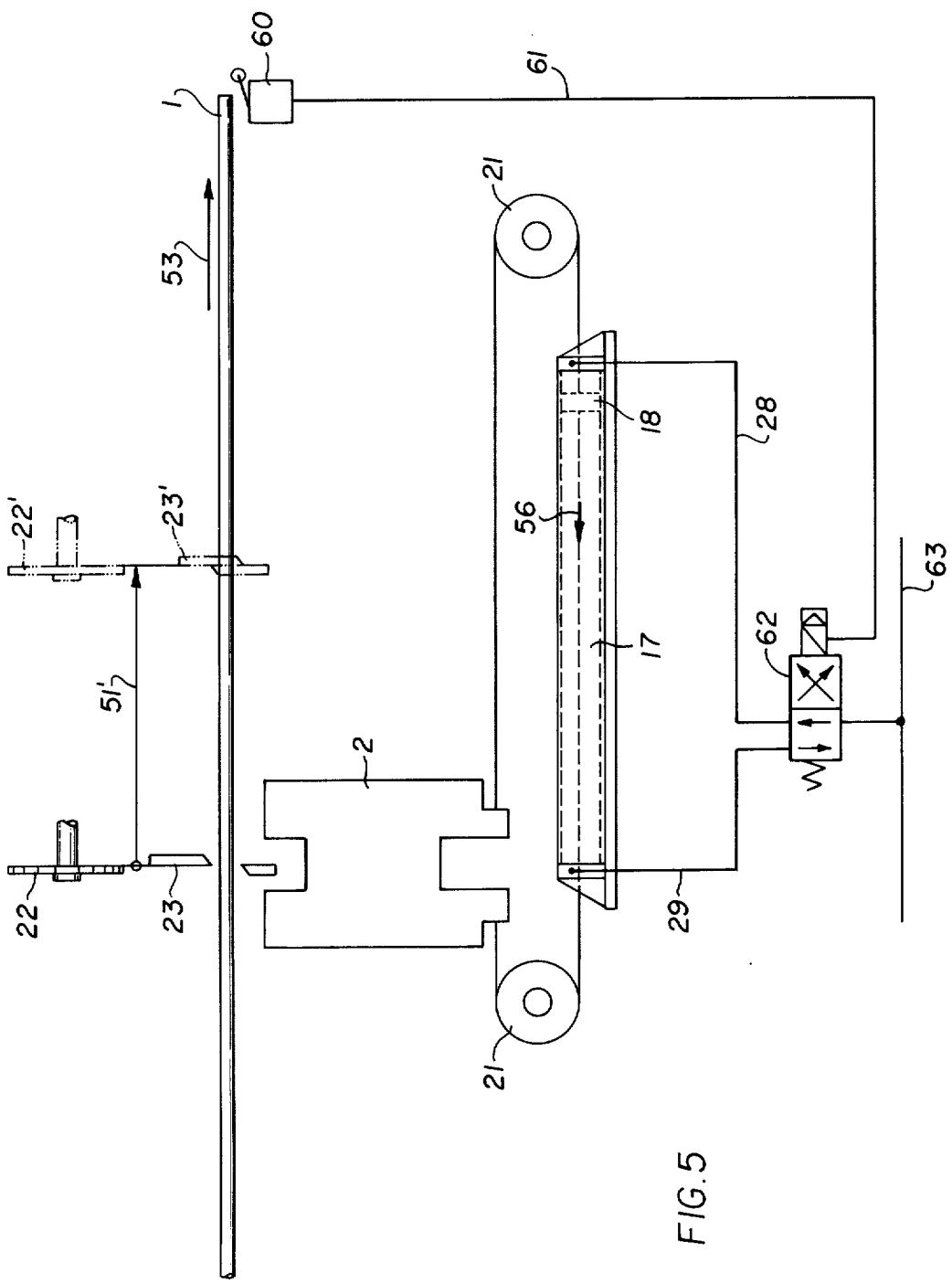
FIG. 5 is a diagrammatic view of the parting device corresponding to that of FIG. 1 and showing schematically the system for initiating the severing operation and for controlling the supply of compressed air to the cylinder.

Referring now to FIG. 5 of the drawing, when the end of a material strand 1 contacts the conventional control switch shown as a releasing or tripping member 60, the latter transmits an electric pulse through the line 61 to a magnetic valve 62 which is energized to exert a magnetic attractive force which opens the valve to admit compressed air from a compressed air pipe system 63 to the cylinder 17 through a pipeline 28 so that the operating piston 18 is displaced in direction of the arrow 56 and, therewith, the severing tool slide 2 is displaced in direction of the arrow 53 which is the same direction as that in which the material strand 1 travels. After the resulting severing or parting operation, the severed material strand 1 is rapidly transported away by a non-illustrated conventional transporting or conveying device so that the releasing or tripping member 60 is freed and produces a electrical reversal pulse which is transmitted through the line 61 to the magnetic valve 62 and reverses the latter so that the compressed air through the line 20 displaces the operating piston 18 back to its initial position.

We claim:

1. Parting device for severing a traveling elongated material into predetermined lengths, comprising track means, a tool slide carrying a parting tool and mounted on said track means for traveling thereon in a direction parallel to a path along which the elongated material travels past the parting device, said tool slide being displaceable at a speed in synchronism with that of the traveling elongated material as a predetermined length is being severed from the elongated material by said parting tool and being displaceable back to a starting position after the predetermined length has been severed, control means for initiating the foregoing displacements of said tool slide, reversible, flexibly yielding drive means ever actuatable for the severing operation and capable of imparting a travel speed to said tool slide greater than the synchronized speed without braking said tool slide, a member traveling at a speed continuously in synchronism with the travel speed of the elongated material, and over-running clutch means interposed between said tool slide and said member for limiting the speed of said tool slide from exceeding said synchronous speed while permitting said tool slide to lag behind said member.

2. Parting device according to claim 1 wherein said felxibly yielding drive means comprises a cylinder operable by compressed air and having a reversing piston displaceable therein, said reversing piston having mechanical means continously connecting said piston to said tool slide.

3. Parting device according to claim 2, wherein said mechanical means comprises a cable extending over reversing rollers and simultaneously serving as piston rods for said reversing piston, said cable having an outer portion secured to said tool slide and extending parallel to at least part of said track means.

4. Parting device according to claim 1 including actuating means having contacts cooperable for initiating said severing operation and controlled valve means for simultaneously supplying compressed air to said cylinder.

5. Parting device according to claim 2, wherein said cylinder and said piston are adapted to accommodate given air pressures and air quantities to effect an optimally short accelerated travel of said tool slide with substantially smooth engagement of said over-running clutch means.

6. Parting device according to claim 1, wherein the traveling elongated material is delivered by a processing machine to the parting device, and wherein said synchronous traveling member comprises a roller chain revolving over sprocket wheels and having a run traveling at synchronous speed with the elongated material and parallel to said track means, one of said sprocket wheels serving as means for synchronously driving said member and being connected for positive rotation to a main shaft of the processing machine.

7. Parting device according to claim 6, wherein said positive rotational connection comprises a main shaft for the parting device, and transmission gear means drivingly connecting said main shaft of the parting device to said one sprocket wheel which serves as said synchronously driving means.

8. Parting device according to claim 6, wherein said over-running clutch comprises a radial roller bearing having an inner and an outer bearing race and including wedge members mounted on said inner bearing race and having surfaces inclined in direction of free-wheeling of said over-running clutch, said inner bearing race being non-rotatably mounted on said tool slide, and including a sprocket wheel seated on said outer bearing race and being connected therewith non-rotatably relative thereto, said last-mentioned sprocket wheel being in continuous meshing engagement with said synchronously traveling run of said roller chain.

9. Parting device according to claim 8 comprising two diverting sprocket wheels mounted on said tool slide, said diverting sprocket wheels being idly rotatable and being spaced from the sprocket wheel non-rotatably connected to said outer bearing race so as to extend said synchronously traveling run of said roller chain in an increased looping angle about the sprocket wheel non-rotatably connected to said outer bearing race.

10. Parting device according to claim 6 wherein said roller chain is at least of double chain construction, and said sprocket wheels have a corresponding construction to accommodate said roller chain.

11. Parting device according to claim 3 wherein the traveling elongated material is delivered by a processing machine to the parting device, and wherein said synchronously traveling member comprises a roller chain revolving over sprocket wheels and having a run traveling at synchronous speed with the elongated material and parallel to said track means, one of said sprocket wheels serving as means for synchronously driving said member and being connected for positive rotation to a main shaft of the processing machine and, wherein said over-running clutch comprises a radial roller bearing having an inner and an outer bearing race and including wedge members mounted on said inner bearing race and having surfaces inclined in direction of freewheeling of said over-running clutch, said inner bearing race being non-rotatably mounted on said tool slide, and including a sprocket wheel seated on said outer bearing race and being connected therewith non-rotatably relative thereto, said last-mentioned sprocket wheel being in continuous meshing engagement with said synchronously traveling run of said roller chain and further comprising two diverting sprocket wheels mounted on said tool slide, said diverting sprocket wheels being idly rotatable and being spaced from the sprocket wheel nonrotatably connected to said outer bearing race so as to extend said synchronously traveling run of said roller chain in an increased looping angle about the sprocket wheel nonrotatably connected to said outer bearing race, said track means and said tool slide being both disposed in a vertical plane, and said cylinder operable by compressed air, the axes of rotation of said reversing rollers for said cable and the axes of rotation of said sprocket wheels being all horizontally disposed.

* * * * *